UNITED STATES PATENT OFFICE.

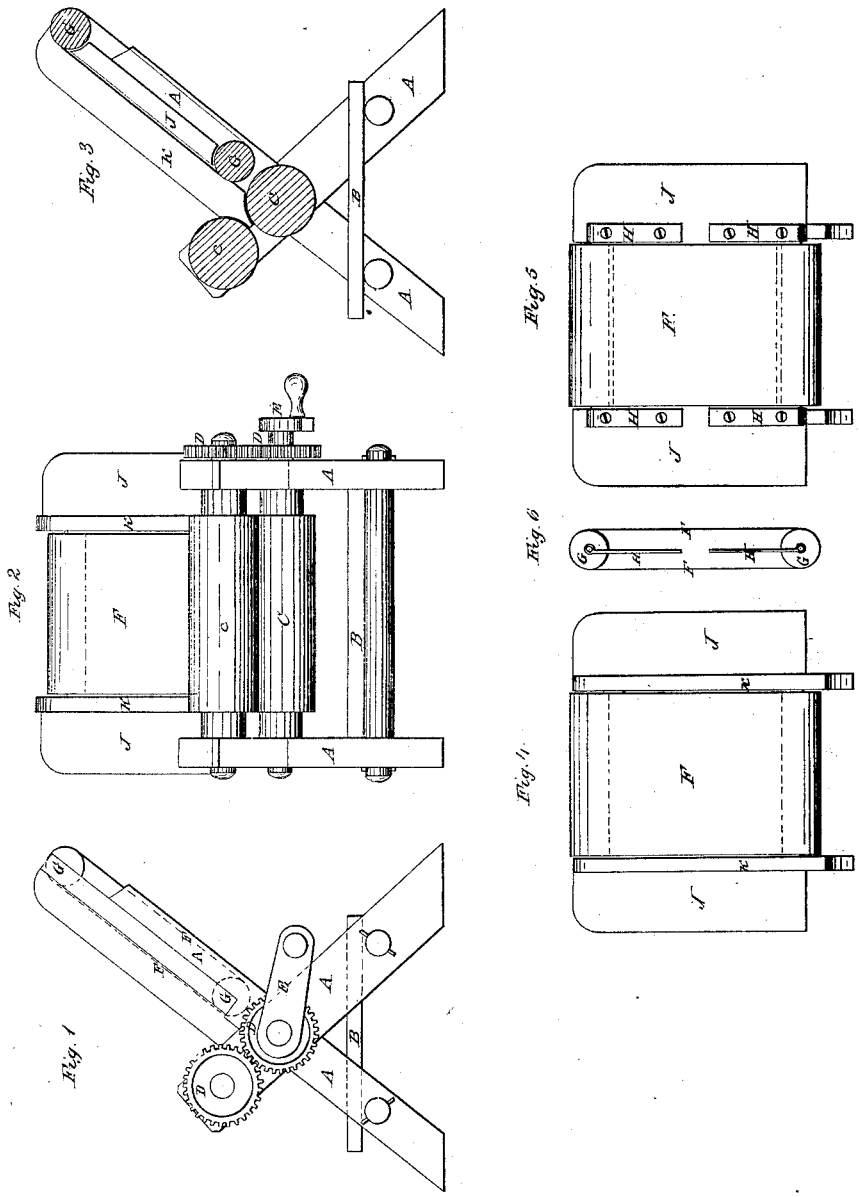

JOHN McCOLLUM, OF NEW YORK, N. Y.

MACHINE FOR ROLLING DOUGH.

Specification of Letters Patent No. 18,758, dated December 1, 1857.

*To all whom it may concern:*

Be it known that I, JOHN McCOLLUM, of the city and county and State of New York, have invented a new and useful Improvement in Machines for Rolling Dough or Similar Substances; and I do hereby declare the following to be a full and exact description of the construction and operation of the same, reference being had to the annexed drawings, making a part of this specification, in which—

Figure 1 is side elevation of machine. Fig. 2 front view. Fig. 3 section. Fig. 4 plan view of feed board and band. Fig. 5 bottom of the feed board showing journal brackets. Fig. 6 end view of pulleys, band and journal brackets.

In order to understand the precise nature of my invention which relates to the manner of feeding dough to rollers to be rolled in continuous sheets, strips or other forms, I will briefly describe the ordinary method which is to place the mass of dough to be rolled or reduced upon a smooth inclined plane or feed-board, as it is called, leading to the opening between the rolls, with sufficient inclination to allow the mass of dough to slide over its surface as required and drawn in between the rolls. This answers a good purpose when the film of dough formed between the rolls has sufficient strength and tenacity to draw down the mass without rupturing or tearing, and the dough sufficiently compact and firm to slip readily over the surface of the feed board without sticking or adhering thereto, but if the dough is slack and soft it will so adhere causing the thin film forming between the rolls to be ruptured and separated from the mass which remains on the feed-board, thereby interrupting the process of forming a continuous sheet or strip.

My invention consists in providing a remedy for this defect by surrounding the feed-board with an endless band which travels on a pulley at each end of the same. The carrying surface of the band is supported by the smooth surface of the feed-board over which it slides, the pulleys on which the band travels must run with as little friction as possible so that the feeding apparatus thus constructed being placed at a proper inclination toward the opening between the rolls the weight of the mass of dough placed on the carrying surface of the band causes it to move and feed down the dough to the rolls as it is required without rupturing or straining the thinnest film formed between them.

I am aware that substances have been fed to rolls on endless bands that receive motion from some other part of the machine. This will not answer for feeding dough to be rolled in continuous sheets because the difference in density and thickness of the successive pieces or chunks, or of the same chunk of dough to be reduced to an uniform size requires constant variation of the feed which can not be practically accomplished by gear but is in my machine effected by the gravity of the mass of dough assisted by a very slight pull from the rolls. But more particularly to describe my invention I will refer to the annexed drawings the same letter in each referring to the same part.

Letter A represents the frame.

B is a receiving board or table on which the sheet or strips of dough are deposited as delivered from the rolls; for this may be substituted an endless carrier band moving with equal surface motion with the rolls.

C C are two rollers rolling together with equal surface motion, their surfaces and plane as shown in the drawings, but may be varied to any of the forms used for rolling dough or other similar substances, the distance between the axes may be fixed as in the drawing, or buried by providing one or both axes with sliding boxes and adjusting screws or other means well known to mechanics.

D D are coupling cog wheels gearing the rollers C C together; E, crank on roller shaft. It may be put on a counter shaft if greater leverage is required.

F is an endless band traveling on pulleys G G, running in journals in brackets H H H H attached to the lower side of the smooth inclined plane or feed-board I, which is secured to the frame and may have checks K K, to confine the dough to the width of the feeding band F.

The inclination of the feeding band should be as near a line perpendicular to the earth as is consistent with capacity for holding the mass of dough in place, the surface of the same being frequently coextensive with the carrying surface of the feeding band. The band should be made of canvas or other suitable material and neatly joined at the seam and sufficiently loose on the pulleys to travel with freedom over the surface of the supporting feed-board. Care should be taken to adjust the band so that while it leads down close to the aperture between the rolls the surface passing around the lower pulleys shall not touch the lower roll and receive motion from it. The practical baker will readily perceive that this mode of feeding will be of great advantage in machines when rolling and cutting is combined, more particularly in loaf bread machines.

To operate the machine a mass of dough is placed on the feeding band and introduced between the rolls. When the rolls are put in motion the weight of the dough assisted by a very slight pull from that part of it drawn in between the rolls imparts motion to the band which delivers the dough as required to the rolls through or between which it passes and is deposited on the receiving table in a continuous sheet or other form without interruption, the interposition of the band preventing adhesion to the feed-board at the same time readily freeing itself as it passes around the pulley at the point of delivery.

I know that friction rollers have been introduced into the bed of the hopper or feed-board to facilitate the feeding of dough to rolls, but they are not equivalent to, nor will they perform the function of, the feeding-band hereinbefore described because the dough if adhesive sticks to them and requires some motive power other than the weight of the dough to detach and transfer it from the surface of each to the next, preventing a feeding apparatus thus constructed from being self feeding or operating as the feeding band does by the weight of the dough.

The dough if soft also sinks down between the friction rollers greatly increasing the surface exposed to adhesion and if sustaining platforms should be placed between the rollers to prevent this they would be so far as they occupied space identical with the old inclined plane or feed-board, the defects of which my invention is designed to overcome.

What I claim and desire to be distinctly understood as limiting my invention to, is—

The combination with rollers suitable for rolling dough or similar substances of an endless feeding band or platform moving on pulleys or friction rollers substantially as described for the purpose of feeding the dough to the rollers as required the band not being geared to the rolls in any way and being free to take its motion from the dough.

JOHN McCOLLUM.

Witnesses:
G. G. TAYLOR,
F. C. TREADWELL, Jr.